US012713996B2

(12) United States Patent
Di Biase

(10) Patent No.: US 12,713,996 B2
(45) Date of Patent: Aug. 25, 2026

(54) CONTROL METHOD FOR AGRICULTURAL OR INDUSTRIAL OPERATING MACHINE AND AGRICULTURAL OR INDUSTRIAL OPERATING MACHINE

(71) Applicant: MDB TECHNOLOGY SRL, Fossacesia (IT)

(72) Inventor: Marco Di Biase, Fossacesia (IT)

(73) Assignee: MDB TECHNOLOGY SRL, Fossacesia (IT)

(*) Notice: Subject to any disclaimer, the term of this patent is extended or adjusted under 35 U.S.C. 154(b) by 0 days.

(21) Appl. No.: 18/708,925

(22) PCT Filed: Nov. 9, 2022

(86) PCT No.: PCT/IB2022/060772
§ 371 (c)(1),
(2) Date: May 9, 2024

(87) PCT Pub. No.: WO2023/084402
PCT Pub. Date: May 19, 2023

(65) Prior Publication Data

US 2025/0000003 A1 Jan. 2, 2025

(30) Foreign Application Priority Data

Nov. 9, 2021 (IT) ........................ 102021000028451

(51) Int. Cl.
*A01B 69/00* (2006.01)
*A01B 76/00* (2006.01)

(52) U.S. Cl.
CPC ............ *A01B 69/007* (2013.01); *A01B 76/00* (2013.01)

(58) Field of Classification Search
CPC ..... A01B 69/007; A01B 76/00; A01B 69/008; A01B 71/02; A01B 59/00; A01D 75/18; A01D 75/182

(Continued)

(56) References Cited

U.S. PATENT DOCUMENTS 6,907,719 B2 * 6/2005 Ligouy ................ A01B 73/005 56/15.1
11,122,740 B2 * 9/2021 Middelberg ....... A01D 41/1278

(Continued)

FOREIGN PATENT DOCUMENTS

DE 102011120884 A1 6/2013
DE 102012109210 A1 4/2014

(Continued)

OTHER PUBLICATIONS

PCT International Search Reporting dated Feb. 6, 2023 for PCT Application No. PCT/IB2022/060772.

(Continued)

*Primary Examiner* — Muhammad Shafi
(74) *Attorney, Agent, or Firm* — McCarter & English, LLP

(57) ABSTRACT

A control method is provided for agricultural or industrial operating machine having a drive unit provided with elements that allow autonomous movement of the machine and a tool couplable to the drive unit by connection and support elements. The method includes storing data characterizing the type of tool and its technical features in an RFID unit; stably arranging the RFID unit on the tool; prearranging, on the machine, a RFID reader for reading the RFID unit; connecting the tool to the machine; automatically establishing a short-range wireless connection between the RFID reader and the RFID unit to recognize a correct coupling of the tool and send data characterizing the type of tool (Continued)

installed and its technical features towards the RFID reader; and setting up settings of operating units of the machine based on the values of the characterizing data. The operating units provide mechanical or hydraulic power to actuate moving parts of the tool.

14 Claims, 4 Drawing Sheets

(58) Field of Classification Search
USPC .......................................................... 701/50
See application file for complete search history.

(56) References Cited

U.S. PATENT DOCUMENTS

2019/0248007 A1 8/2019 Duggy et al.
2020/0000002 A1 1/2020 Chrysanthakopoulos et al.
2020/0077561 A1 * 3/2020 Wieckhorst .......... A01B 69/004
2020/0106344 A1 4/2020 Okuhata et al.
2020/0356096 A1 * 11/2020 Leeb ...................... G01C 21/20
2020/0390028 A1 12/2020 Kuriyagawa
2021/0168989 A1 * 6/2021 Leeb .................. A01M 7/0042
2021/0212249 A1 7/2021 Disberger et al.
2021/0259148 A1 * 8/2021 Schmidt ............... G05D 1/0219
2021/0405644 A1 * 12/2021 Berridge .............. G05D 1/0223

FOREIGN PATENT DOCUMENTS

DE 102016101189 A1 7/2017
EP 2116400 A1 11/2009
JP 2001-323516 A 11/2001
JP 2021133904 A 9/2021
WO WO-2013-066803 * 5/2013

OTHER PUBLICATIONS

Japanese Office Action dated May 8, 2026 for Japanese Patent Application No. 2024-549583.

* cited by examiner

A
1
5,T1
X
Z

X
A1
5,T1
1
A3
A
Y
G
R
10
M
A2

5,T2
1
M

CONTROL METHOD FOR AGRICULTURAL OR INDUSTRIAL OPERATING MACHINE AND AGRICULTURAL OR INDUSTRIAL OPERATING MACHINE

CROSS-REFERENCE TO RELATED APPLICATIONS

This Patent Application is a 35 U.S.C. § 371 National Stage filing of International Application No. PCT/IB2022/060772, filed Nov. 9, 2022, which claims priority from Italian Patent Application No. 102021000028451 filed on Nov. 9, 2021, the entire disclosures of which are incorporated herein by reference.

TECHNICAL FIELD

The present invention relates to a control method for agricultural or industrial operating machine and an agricultural or industrial operating machine.

BACKGROUND OF THE INVENTION

Agricultural or industrial operating machines, for example, machines for road or forestry maintenance are known, comprising a drive unit provided with a device (wheels or tracks) configured to allow the autonomous movement of the machine itself in a work area and configured to carry a tool configured to carry out a given operation in the work area, for example a cutting, cleaning, collection, levelling operation, etc.

The operating machine can be operated remotely or by remote control by an on-site operator.

The tool carries moving parts that are powered by operating units of the operating machine such as motors, pumps or actuators. Each tool is characterised by its own operating parameters, and therefore with the replacement of the tool, the settings of the operating units of the machine must be changed. This operation is done manually and often involves non-negligible times.

In addition, the manual setting operation is a potential source of error because if the settings of the operating units are not correct (for example, in the case where the settings are not updated after replacement of the tool) it could cause the tool to malfunction. In some cases, this malfunction could lead to potentially dangerous situations.

Therefore, the need is felt to operate an automatic setting of the operating units of the operating machine in order to reduce the times of the setting operation and reduce the human errors associated with it.

The patent US2020073366A1 describes a method for adjusting the setting of an operating machine, by a machine operator comprising the following steps:

a) the operator moves a control member to set a maximum driving speed of an actuator or motor;

b) storing a setting of maximum speed performed in step a) in a dedicated memory, the memory integrated into a computer of a control station of the handling machine;

c) the control station by adjusting a working power of the handling machine to operate within the parameters of the control law, the adjustment envisages that the handling machine does not exceed the stored maximum working speed(s).

Also known, for example from EP3606629, is a type of radio-controlled handling machine able to operate on very steep slopes (up to 60° gradient) and can actuate the tools having different types of danger. During the operation of this machine, it is necessary for an operator to remain outside of any dangerous work areas. Since the same operating machine can actuate different tools from each other (such as a shredder, a snow cannon, a chipper, etc. . . . ), the conformation, the size, and the dangerousness of the work areas depend on the type of tool installed. For example, when the shredder is in use, there are high risks of projecting material and/or machine parts (for example, tool fragments) towards the operator or third persons; whereas, when the chipper is in use, it is necessary for the operator to approach in order to load the material to be chipped, and the risks of projecting material towards the outside are non-existent.

The need is therefore felt to introduce safety systems that take into account the type of tool so as to ensure safe operation and nullify the risk of accidents and/or personal injury.

OBJECT OF THE PRESENT INVENTION

The previous objects are achieved by the present invention in that it relates to a control method for agricultural or industrial operating machine of the type described in the appended claims.

The present invention also relates to an agricultural or industrial operating machine of the type described in the appended claims.

BRIEF DESCRIPTION OF THE DRAWINGS

The invention will now be illustrated with reference to the appended figures, which illustrate non-limiting embodiments thereof, wherein.

DETAILED DESCRIPTION OF THE PREFERRED EMBODIMENT

Figure 1:
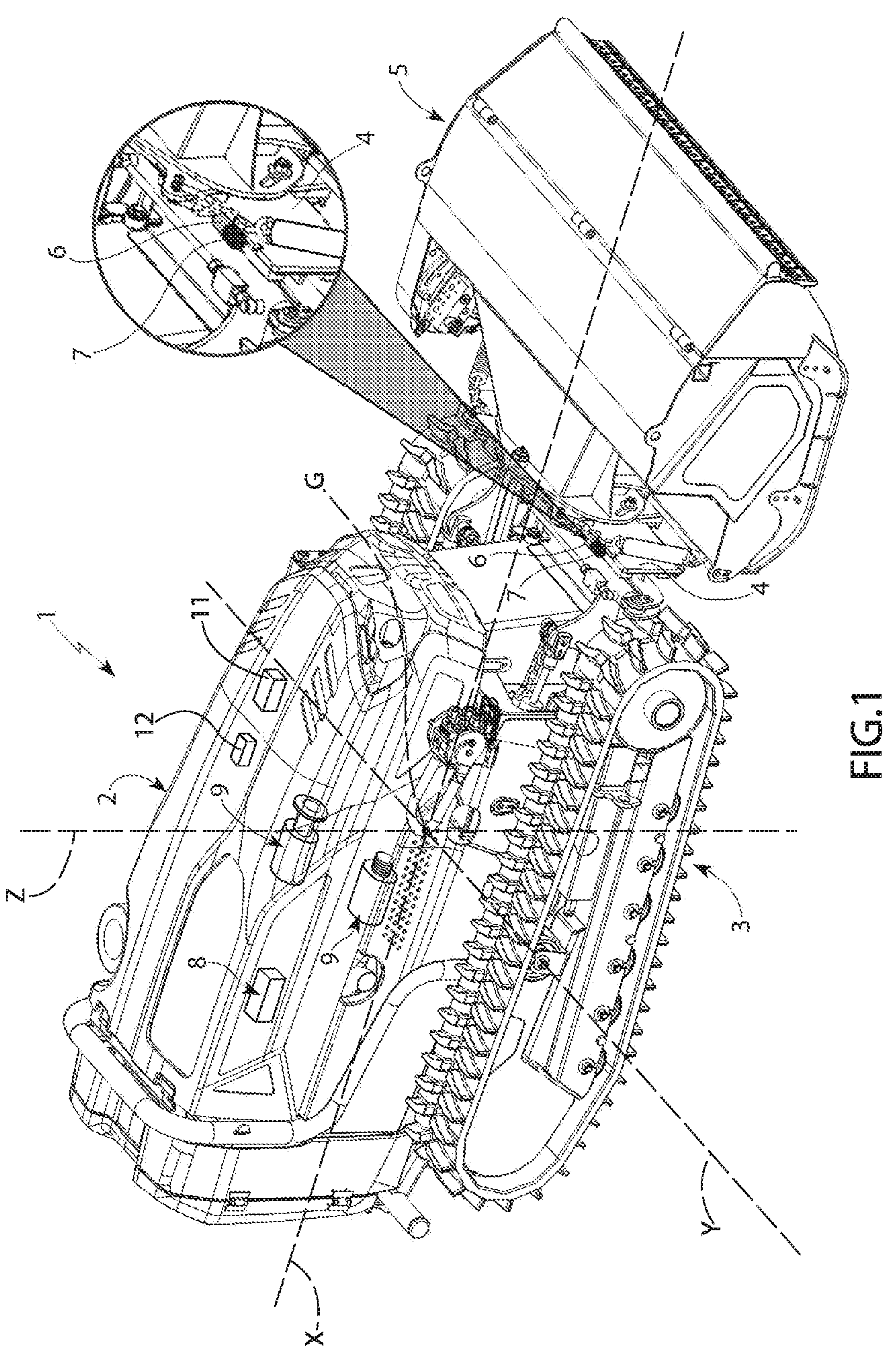
FIG. 1 represents, in perspective view, an agricultural or industrial operating machine made according to the dictates of the invention.

In the attached FIG. 1, 1 indicates, as a whole, an agricultural or industrial operating machine, which in the preferred embodiment of the invention is a machine for road or forestry maintenance (of a known type and therefore not described in detail) comprising a drive unit 2 powered by an endothermic or electric motor (not illustrated), and provided with a device configured to allow the autonomous movement of the operating machine itself in a work area, in the illustrated example a pair of wheeled tracks 3.

Typically but not exclusively, the drive unit 2 is of the remote-controlled type and moves in the work area based on a remote control signal and/or using data sensed in the field such as, for example, data detected by sensors (for example, cameras, proximity sensors) and used by an artificial intelligence program to carry out a given operation.

Examples are illustrated in FIGS. 2 to 6 wherein the remote control is a radio control 10 that is controlled by an operator M operating at a safe distance. In other words, as will be better illustrated in the following, the operator M operates outside a danger zone A.

The drive unit 2 is provided at the front, in the example illustrated, with a connection and support device 4 (also of a known type and therefore illustrated schematically) which is configured to carry a tool 5, for example, a shredder T1 tool configured to operate on turf and/or bushes to execute a grass mowing and shrub cutting operation. In any case, the machine 1 can perform a variety of functions depending on the type of tool 5 mounted thereon. In the case of shredding, the tool 5 is used for grinding shrubs and grass, but different tools can be provided. The machine 1 can also mount telescopic arms, tillage tools, tools for handling objects or soil. In other words, a tool 5 is chosen from within a group comprising different devices depending on its end purpose. By way of non-limiting example, a tool 5 can be: a shredder; a log cutter; a fork lift system; a bucket; a cutter bar; an atomizer; a tiller; a spade; a lawn mower; a snow blower; and the like.

A tool carrier platform could also be provided with a tool carrier with an upper attachment. The connection and support device 4 could have a different arrangement, for example, be arranged at the back or be arranged in a higher position than the one illustrated.

According to the present invention, the machine 1 is provided with an RFID unit 6 (of a known type) stably mounted on the tool 5 and configured to carry out a data exchange with a reading unit 7 (of a known type) when the tool 5 is correctly arranged on the connection and support device 4. In fact, in this condition, the RFID unit 6 and the reading unit 7 are facing/approaching or arranged at a distance configured to allow a two-way data exchange between the reading unit 7 and the RFID unit 6.

In the example illustrated, the reading unit 7 is arranged on the connection and support device 4 but its positioning could be different.

The reading unit 7 communicates with a control unit 8 of the machine 1, which in turn controls operating units 9 of the machine 1 itself such as: motors, pumps, actuators, etc. (illustrated schematically). The operating units 9 of the machine 1 are configured to provide mechanical or hydraulic power to actuate moving parts of the tool 5.

As is known, a Radio-Frequency IDentification (RFID acronym) unit is a technology for recognizing and validating and/or automatically storing information at a distance. It is based on data storage in particular passive electronic devices capable of responding to calls in proximity to active devices, whether stationary or portable, in this case the reading unit 7.

The identification and exchange of information takes place in radio frequency. One of the most recent implementations of the RFID is the Near Field Communication standard, which allows data exchange between two devices at a distance of about 10 cm and with transmission speeds of about 424 kbps.

Data characterising the type of tool 5 are stored in the RFID unit 6, for example:

- tool serial number (can be an alphanumeric code);
- tool name (can be a commercial name defined by the manufacturer);
- tool code (can be a unique identification code defined by the manufacturer);
- tool work hours (this aspect will be clarified in the following);
- machine compatibility code obtained from a reference to which the control unit analyses the compatibility between the tool 5 and the machine 1 in order to ensure user safety.
- Safety function code. This is a code that identifies different settings of the machine 1 depending on the tool. Each code can be unique to a single tool or represent a group of tools having the same "safety requirements."
- Setup driving or response of the machine 1 (dynamic, natural, sensitive);

and the technical features of the tool 5, for example:

- motor revolution number 9 (the motor 9 is arranged on the drive unit 2) that provides mechanical power to the tool;
- pump rotation direction 9 (the pump 9 is arranged on the drive unit 2) that provides hydraulic power to the tool;
- flow rate of the pump 9 (the pump 9 is arranged on the drive unit 2) that provides hydraulic power to the tool.

In particular, the safety function code automatically sets the safe work settings to activate the machine 1 safety actions. The work settings comprise combinations of permissible ranges of given work parameters; in case where the actual value of one or more work parameters falls outside the relative permissible range, a respective safety work action is activated.

Advantageously, the safe work settings identify the conformation and/or extent and/or position of any danger zones A around tool 5 and/or the machine 1 during use, so as to activate the safety or stopping of the machine 1 and/or of the tool 5 if a dangerous situation occurs. For example, in the case where the machine 1 is remotely controlled via the cloud, a dangerous situation could be the detection of an obstacle (for example, a pole or boulder) within a danger zone A. Or, in the case where the machine 1 is a radio-controlled vehicle, a dangerous situation is the detection of an operator M within a danger zone A.

A safety action is chosen from within a group of different safety actions depending on the specific combination of actual work parameters of the machine. For example, a safety action may involve one or more of the following steps (the following order is only exemplary and not chronological: the steps can also take place simultaneously or in a different order):

- slow down the tool;
- reduce the load on the tool;
- change the operating conditions of the machine 1 (advancing speed; advancing direction; track widening; and the like);
- stop the tool 5;
- stop the machine 1.

Figures 2, 3:
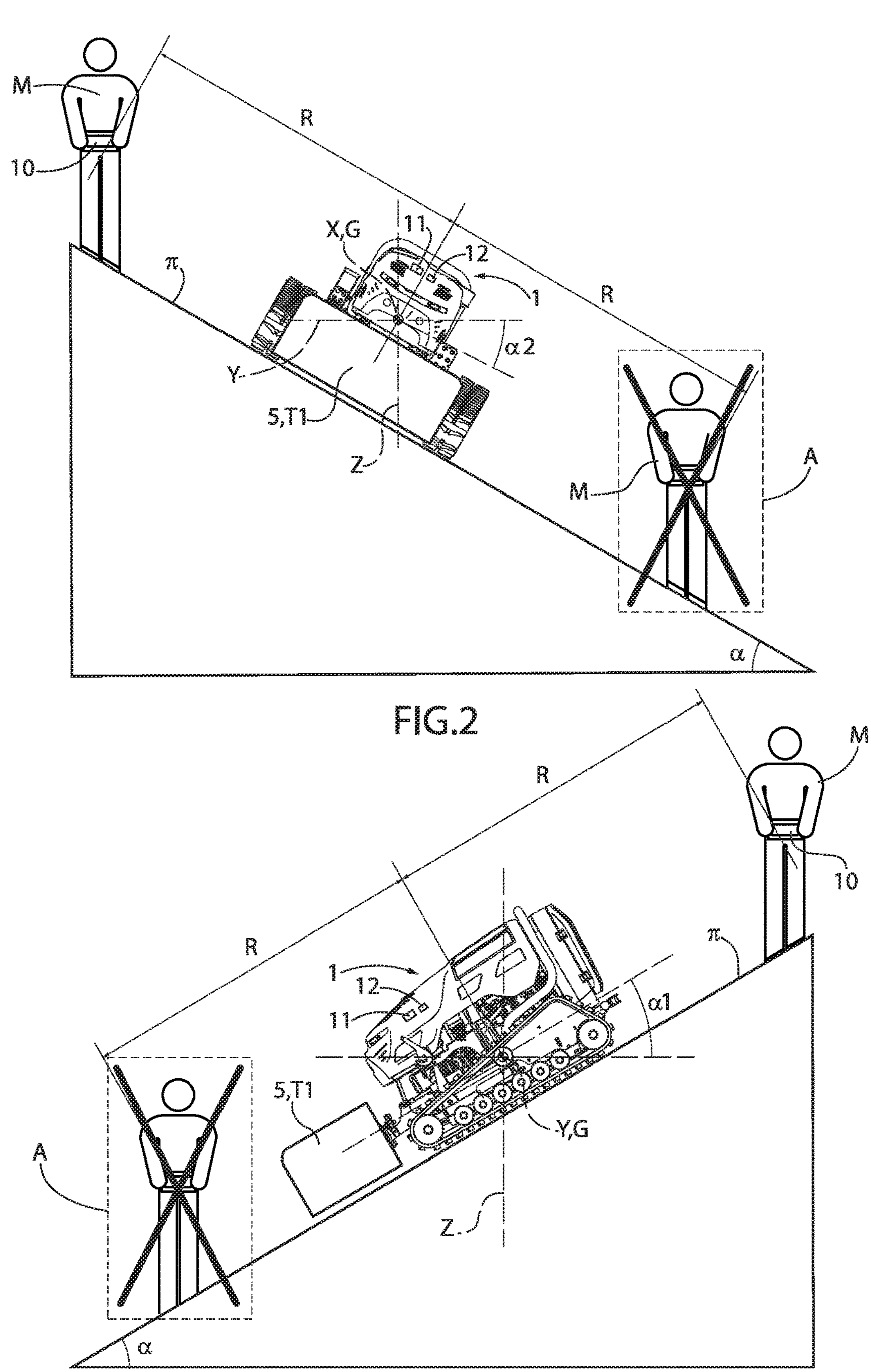
FIGS. 2 to 4 are schematic views showing an operating machine in respective different operating configurations.

According to the example illustrated in FIGS. 2 and 3, the machine 1 is able to move while operating the tool 5 on slopes with an inclination $\alpha$ of even 60°. In these operating conditions there is the potential danger of crushing an operator M, in the case where errors or a rollover occur (the risk increases if the machine 1 advances at full speed and the tool 5 works under full load). In addition, if the tool 5 is a shredder T1 (as in the case illustrated in FIGS. 2 to 5) there is a high risk of material and/or the machine parts (for example, tool fragments) being projected towards the operator M or third persons. In fact, even if a shredder T1 is provided with passive type protections (straps, metal sheet carters, chains, rubber strips) there is a risk of the material being projected outwards. This risk can also be accentuated by the use of the machine 1 on slopes with high a inclinations.

Advantageously, according to the present invention, the detection of the type of tool 5 automatically sets the conformation and the size of any danger zones A around the machine 1 within which an operator M cannot enter during the operation of the machine 1 and/or the tool 5.

Advantageously, the control unit 8 of the machine 1 is configured to calculate, in real time, a minimum safety distance R to be maintained from an ideal reference point G (for example, the barycentre) of the machine 1.

Depending on the type of tool 5 installed on the machine 1 and the type of the conditions of instantaneous use (whether the machine 1 is proceeding uphill, downhill, the width of the support base in the case of a vehicle with variable track width), the minimum distance R may vary depending on the position of the danger zone A with respect to the machine 1. For example, if the machine 1 advances on a support plane $\pi$ without any tool 5, the machine 1 has a front danger zone A (denoted by A1) and a rear danger zone A (denoted by A2).

Figures 4, 5:
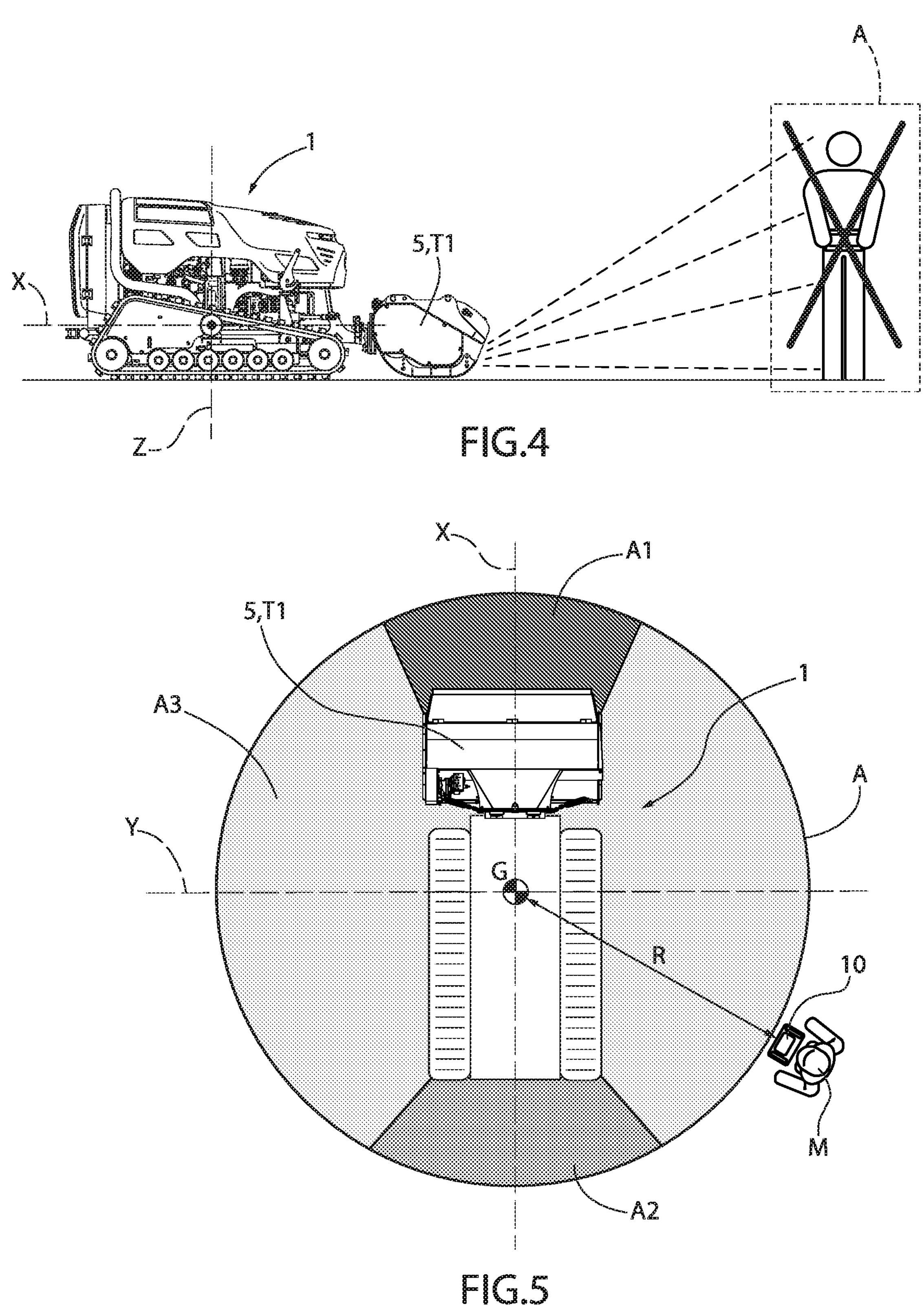
FIG. 5 is a schematic and plan view showing a dangerous work area of an operating machine according to the present invention.
Figure 6:
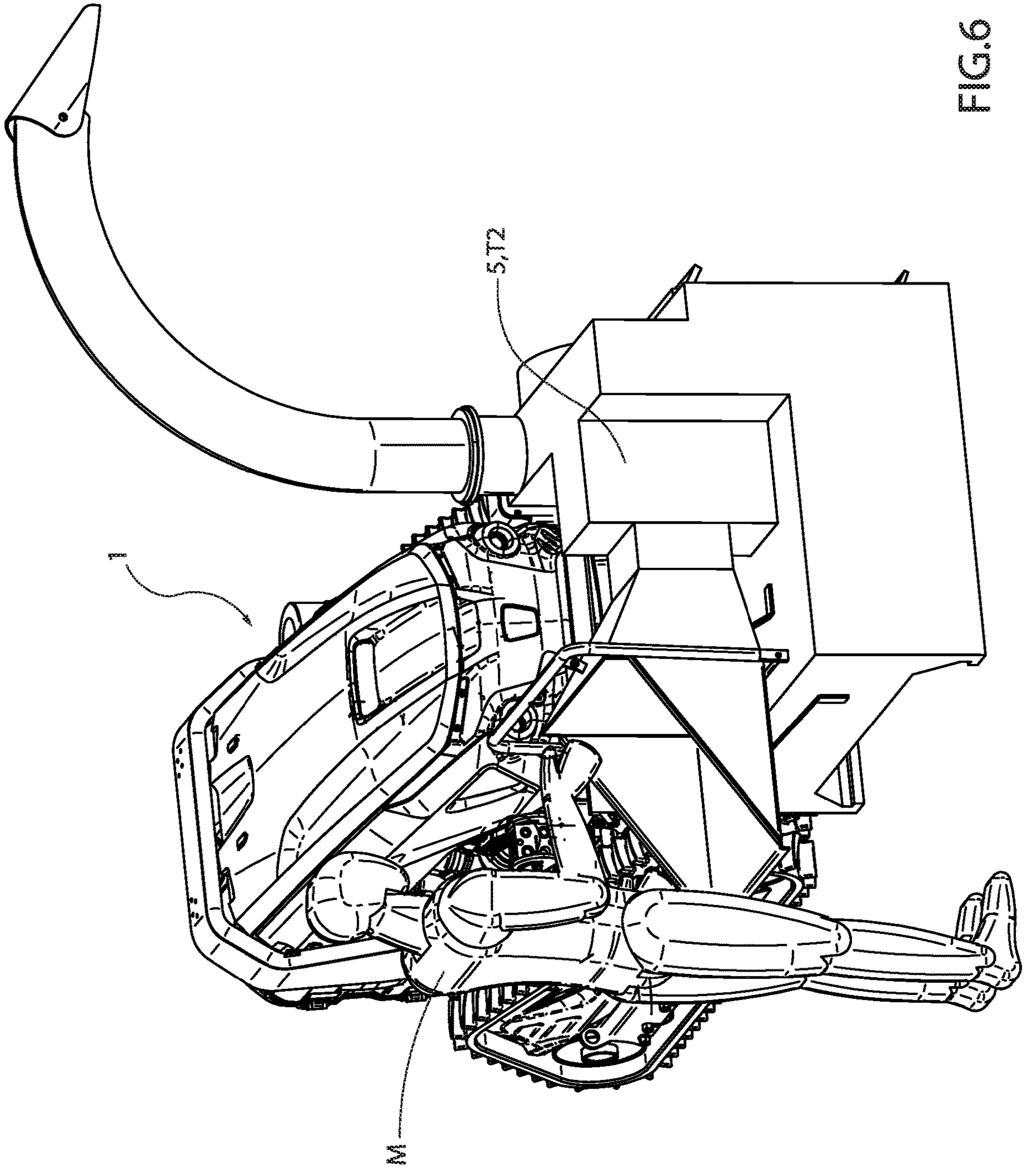
FIG. 6 is a schematic view in an operating machine in a further different operating configuration.

According to the examples illustrated in FIGS. 5 and 6 since during use the radio control 10 is actuated directly by an operator M, it is assumed that the position of the operator M corresponds to that of the radio control 10. According to the variants not illustrated, the machine 1 can be provided with different detection systems, for example, cameras, infrared sensors, proximity sensors, or sensors wearable by an operator M (such as wristbands or the like) that communicate wirelessly with the machine 1.

According to the examples illustrated in FIGS. 5 and 6, the control unit 8 of the machine 1 is configured to also detect, in real time, the relative position (front, back, right, left, and the like) between the radio control 10 (and therefore of the operator, or more generically of an external body) and an X, Y, Z reference system (according to the example illustrated X is the longitudinal axis, Y the transverse axis, and Z the vertical axis) with origin at the reference point G. Depending on the relative position between radio control 10 and the reference point G, the minimum safety distance R may vary. It should be noted that the reference system X, Y, Z illustrated is for exemplary and non-limiting purposes and that the position of the reference point G may vary.

Further, a machine 1 according to the present invention is capable of operating on gradients with steep inclinations $\alpha$, of even 60°, so for safety reasons, an operator M should never position himself downstream of the machine 1, namely, at a lower altitude than the position of the machine 1. Therefore, advantageously, the machine 1 is provided with an inclinometer 11 that is configured to detect with respect to the reference system X, Y, Z: the inclination of the machine 1 around the transverse axis Y, denoted as inclination $\alpha$1 (FIG. 3); and/or the inclination of the machine 1 around the longitudinal axis X, denoted as inclination $\alpha$2 (FIG. 2). The determination of the conformation and the size of the danger zone A depends on both the type of inclination $\alpha$1 and/or $\alpha$2 and the magnitude of the inclinations.

Advantageously, the control unit 8 combines the data relative to the inclinations $\alpha$1 and/or $\alpha$2 and the data relative to the instantaneous position of the radio control 10 (or more generally of an obstacle) to detect any dangerous situations and, if necessary, to activate the safety actions.

In particular, the determination of the danger zone A is also a function of the inclination $\alpha$1 and/or $\alpha$2 of the machine 1. In fact, the projection of material is different if it occurs while the machine 1 is traveling uphill or downhill or if it is working inclined to the side.

In addition, the machine 1 can operate the tools 5 that require heavy workloads. It is best if a machine 1 does not advance at maximum speed while the tool 5 operates at maximum load. Advantageously, the permissible advancing speed and the permissible load of the tool 5 vary according to the instantaneous inclination $\alpha$1 and/or $\alpha$2 of the machine 1.

FIGS. 2 to 5 illustrate by way of example some possible dangers for the operator M during the operation of the machine 1: in particular, in these figures, the crossed-out operator M symbol schematically indicates the danger zone A for the respective operating configurations. FIGS. 2 and 3 show the machine 1 while working on a slope; in this case, the danger zones A are those downstream of the machine 1 itself.

FIG. 4 illustrates the danger of material projection against an operator M positioned in front of the tool 5.

FIG. 5 illustrates in plan view the danger zone A around a machine 1 that actuates a shredder T1. In this diagram with the different gradations of colour, danger zones with different degrees of danger are indicated as A1, A2 and A3. Advantageously, the control unit 8 of the machine 1 chooses the safety actions within a group of different safety actions for the respective work parameters, depending on the degree of danger of the danger zone A. In this manner, advantageously, it is possible to calibrate the interventions, namely, the suitable combination of work parameters, according to actual needs. This avoids inefficiencies, such as unnecessary machine stops, or dangerous situations that could still create problems for the operator M, in fact, in some contexts (such as on very steep slopes) it may be preferable to stop only the tool 5 and allow the machine 1 to advance or reverse.

FIG. 6 illustrates a variant in which the tool 5 is a chipper T2. In this case, an operator M must have free access to the chipper T2 in order to load the material to be processed. In other words, in the case of using a chipper T2, the danger zone A is substantially the one in the immediate vicinity of the machine 1 to prevent an operator M from being run over.

Also in the case of a chipper T2, the advancing and loading speed of the machine 1 can be adjusted according to a possible inclination $\alpha$. Advantageously, the machine 1 comprises light, sound, or similar alarms 12 that are configured to signal any dangerous situations. The control unit 8 is configured to actuate said alarms 12 according to the type of tool 5 installed and the instantaneous conditions of use of the machine 1.

The operations of the method of the present invention comprise the following.

Data characterizing the type of tool 5 and its technical features are stably stored in the RFID unit 6 using known writing technologies, and the RFID unit 6 is stably arranged on the tool 5.

The tool 5 is connected to the machine 1 by the connection and support device 4 such that the units 6 and 7 are arranged facing/near each other, and automatically establishing a short-range wireless connection between the reading unit 7 and the RFID unit 6 in order to recognise a correct coupling of the tool 5.

In this way, the data characterizing the type of tool 5 installed and its technical features are read by the reading unit and transferred to the control unit 8 which sets up the settings of the operating units 9 based on the values of the characterizing data previously taken. Operational operation of the machine 1 is therefore enabled at the end of the step and a step of machine use is started. The machine therefore adjusts the settings of its operating units 9 fully automatically and therefore quickly and safely.

An incorrect manual setting of operating units 9 of the machine 1 is therefore prevented (for example, too high a rotational speed of a motor, too high a pressure generated by a pump) can damage the tool 5.

Advantageously, in the case of a machine 1 actuated on site by an operator M by radio control 10, the automatic recognition of the safety function code ensures that the machine 1 operates in complete safety, by setting the safety actions according to the type of tool 5 installed. In addition, the safety function code determines the conformation and/or extension and/or position and/or degree of danger of any danger zones A by combining with the data relative to the tool 5 also data relative to the instantaneous work parameters such as: the advancing speed of the machine 1, the load of the tool 5, the inclination of the machine 1; and/or the widening of the support base of the machine 1.

The safety actions may envisage the slowing down and/or automatic stopping of the tool 5 and/or of the machine 1. The safety actions may envisage the automatic issuing of alarm signals (light and/or sound).

The RFID unit 6 also has no battery and is immune to external agents such as water. In addition, the costs of an RFID unit are extremely low (a few euros). In case of failure, the RFID 6 unit is easily and inexpensively replaced.

It is also envisaged the step of activating a time counter after the start of a step of use and stopping the counter at the end of said step of use measuring the time of continuous use $T_{uc}$ of the machine 1. The time of continuous use $T_{uc}$ is stored in the RFID unit by accumulating a time of total use $T_{ut}$ including the sum of times of continuous use of successive steps between them.

It is further envisaged the step of storing in the RFID unit any accesses to any danger zone A (by an operator M and/or an obstacle) during the operation of the machine 1 and/or of the tool 5.

It is also envisaged the step of storing in the RFID unit any activations of safety actions during the use of the machine 1 and/or the tool 5. In this case, it is envisaged to store in the RFID unit the instantaneous work parameters that generated the activation of the safety actions.

In the event that reading unit 7 fails to read the RFID unit 6, the tool 5 is not recognized and the start-up of the machine 1 and therefore its use is prevented. This function further enhances the safety since the installation of non-compliant tools 5 is prevented.

The reading of the RFID unit 6 can also be performed by other handheld devices (for example, smartphones, not illustrated) provided with an app that manages maintenance of the attachments and the status or the information recorded in the RFID unit 6; therefore, it is possible to identify the tool 5 and establish whether scheduled maintenance needs to be carried out by reading the time of total use $T_{ut}$ and record on the app that maintenance has been carried out in order to have a shared electronic log.

Since the time of continuous use is stored on the RFID unit 6 the app can be used to get the information $T_{ut}$ on the number of work hours and have immediate information about the need for maintenance of the tool itself.

Thanks to the storage in the RFID unit of any accesses to the danger zone A during the operation of the tool 5 it is possible to perform a posteriori control actions on the correct use of the machine 1 and/or of the tool 5 (by the operator M or remotely and the possible encounter of obstacles).

Thanks to the storage in the RFID unit of any safety actions, it is possible to verify a posteriori any factors that may have generated a dangerous situation and a possible failure of the machine 1 and/or of the tool 5. Therefore, this data can be advantageously used for scheduling the maintenance activities.

An accidental release of the tool 5 can also be detected if the previously established connection between reading unit 7 and RFID unit 6 is lost and possibly later re-established. The accidental disconnection event is stored in the RFID unit 6. In this case, an indication to the operator who is remotely controlling the machine through the channel used for the remote control may also be provided. An accidental release of the tool 5 can occur when an external body accidentally pushes the attach/release button (not shown) of the tool 5. In this way, if this happens a danger signal is sent.

This system can be sold as a KIT that can be applied to existing machines/tools.

LIST OF NUMBERS

1 operating machine
2 a drive unit
3 pair of tracks
4 connection and support device
5 tool
6 RFID unit
7 reading unit
8 control unit of the machine
9 operating unit of the machine
10 radio control
11 inclinometer
12 alarm
A, A1, A2 danger zone
T1 shredder
T2 chipper
M operator
R distance
G reference point
X longitudinal axis
Y transverse axis
Z vertical axis
α, α1, α2 inclination

The invention claimed is:

1. A control method for an agricultural or industrial operating machine, wherein the agricultural or industrial operation machine comprises a drive unit which allows autonomous movement of the machine itself in a work area, a tool configured to carry out a specific work operation, and operating units which actuate mobile parts of said tool, wherein the tool is selected from a group of different types of tools in function of the specific work operation to be carried out, and wherein the tool is couplable, in use, to the drive unit;

the method comprising the following steps:

a) storing, in an RFID unit, data characterising the type of tool and its technical features;

b) arranging the RFID unit on the tool;

c) prearranging, on the machine, a RFID reader for reading the RFID unit;

d) connecting the tool to the machine;

e) automatically establishing a short-range wireless connection between the RFID reader and the RFID unit in order to recognise a correct coupling of the tool and send characterizing data of the type of tool installed and its technical features to the RFID reader;

f) setting up the settings of operating units of the machine based on the values of the characterising data taken in step e);

g) enabling the operation of the machine at the end of step e); and the method being characterised in that it comprises:

h) setting up safe work settings based on the values of the characterising data taken in step e);

i) detecting the actual values of said work parameters during use;

j) activating safety actions or stopping of the machine and/or of the tool in the case where the actual value of one or more of said work parameters falls outside a safe work setting.

2. The method according to claim 1, wherein the machine is remotely actuated by a radio control; wherein the safe work settings identify the conformation and/or extent and/or position and/or degree of danger of any danger zones around the tool and/or the machine so as to activate safety actions or stop the machine and/or the tool when the operator-enters a danger zone.

3. The method according to claim 2, wherein the work parameters comprise the minimum distance and/or the relative position between the radio control and the machine.

4. The method according to claim 2, wherein the work parameters comprise: the distance between the radio control and a predetermined reference point of the machine.

5. The method according to claim 1, wherein the machine has a longitudinal axis and a transverse axis; wherein the work parameters comprise: the value of a first inclination of the machine about the transverse axis; and/or a second inclination of the machine about the longitudinal axis; the determination of the danger zone.

6. The method according to claim 1, wherein the work parameters comprise: the advancing speed of the machine; and/or the work load of the tool.

7. The method according to claim 1, wherein the step of activating a time counter after the start of a step of use according to d) and stopping said counter at the end of said step of use measuring the time of continuous use of the machine; said method further comprising the step of storing in the RFID unit said time of continuous use by accumulating a time of total use including the sum of times of continuous use of successive steps between them.

8. The method according to claim 7, wherein said step of storing said time of continuous use is performed periodically at pre-set time intervals.

9. The method according to claim 1, wherein the start-up of the machine and therefore its use is prevented if the RFID reader fails to read the RFID unit.

10. The method according to claim 1, wherein the step of detecting the loss of data connection previously established between the RFID reader and RFID unit to detect an accidental tool release; said method further comprising the step of storing the accidental disconnection in the RFID unit.

11. An agricultural or industrial operating machine, comprising a drive unit which allows the autonomous movement of the machine itself in a work area, a tool which is configured to carry out a specific work operation, and operating units, which actuate mobile parts of said tool, the tool being selected from a group of different types of tools in function of a specific work operation to be carried out; the tool being couplable, in use, to the drive unit, characterised in that it comprises:

an RFID unit arranged on the tool and configured to store data characterising the type of tool and its technical features;

a RFID reader for reading the RFID unit arranged in the machine;

wherein the RFID reader and the RFID unit are configured to automatically establish a short-range wireless connection when the tool is coupled correctly in order to send characterizing data of the type of tool installed and its technical features to the RFID reader and setting up the settings of the machine based on values of the characterising data present on the RFID unit;

wherein said machine is configured to set up safe work settings to activate safety actions or the stopping of the machine itself and/or the tool.

12. The machine according to claim 11 configured to be actuated by an operator by a radio control; wherein said radio control is configured to exchange data and/or signals with said machine so as to instantaneously detect the mutual position between the radio control and the machine; wherein the safe work settings identify the conformation and/or position and/or extent and/or degree of danger of any danger zones around the machine; wherein the machine is configured to activate safety actions if the instantaneous position of the radio control falls within a danger zone.

13. The machine according to claim 12 and comprising an inclinometer configured to detect the inclination of the machine.

14. The machine according to claim 12 and comprising at least one alarm system (1) for emitting alarm signals if the radio control enters a danger zone.

* * * * *